United States Patent [19]
Waschatz et al.

[11] Patent Number: 5,661,971
[45] Date of Patent: Sep. 2, 1997

[54] METHOD FOR REDUCING POLLUTANTS IN THE EXHAUST GAS OF A MULTI-CYLINDER INTERNAL COMBUSTION ENGINE

[75] Inventors: Uwe Waschatz, Meine; Wolfgang Wehling, Brunswick, both of Germany

[73] Assignee: Volkswagen AG, Wolfsburg, Germany

[21] Appl. No.: 560,297

[22] Filed: Nov. 17, 1995

[30] Foreign Application Priority Data

Dec. 2, 1994 [DE] Germany .................. 44 42 883.9

[51] Int. Cl.$^6$ .................................................. F01N 3/00
[52] U.S. Cl. .................. 60/274; 60/285; 123/443
[58] Field of Search ................. 60/274, 284, 285, 60/282; 123/443

[56] References Cited

U.S. PATENT DOCUMENTS

| | | | |
|---|---|---|---|
| 3,827,237 | 8/1974 | Linder et al. | 60/274 |
| 4,345,432 | 8/1982 | Iida et al. | 60/290 |
| 5,237,818 | 8/1993 | Ishii et al. | 60/285 |
| 5,249,560 | 10/1993 | Gian et al. | 123/443 |
| 5,522,219 | 6/1996 | Orzel et al. | 60/274 |
| 5,535,586 | 7/1996 | Ohta et al. | 60/285 |

FOREIGN PATENT DOCUMENTS

| | | |
|---|---|---|
| 48808 | 8/1981 | European Pat. Off. . |
| 277578 | 1/1988 | European Pat. Off. . |
| 499207 | 2/1992 | European Pat. Off. . |
| 599061 | 10/1993 | European Pat. Off. . |
| 2163297 | 6/1973 | France . |
| 3339429 | 5/1985 | Germany . |
| A4029672 | 4/1992 | Germany . |
| 4029672 | 9/1992 | Germany . |
| 4112478 | 10/1992 | Germany . |
| 4128823 | 3/1993 | Germany . |
| 4342656 | 6/1994 | Germany . |
| 2077962 | 12/1981 | United Kingdom . |

OTHER PUBLICATIONS

Patent Abstracts of Japan, vol. 18, No. 408 (M–1647), Jul. 29, 1994, and JP–A–06 117304 (Nippodenso) Apr. 26, 1994.
Patent Abstracts of Japan, vol. 950, No. 004 and JP–A–07 103034 (Unisia Jecs Corp.) Apr. 18, 1995.

*Primary Examiner*—John T. Kwon
*Attorney, Agent, or Firm*—Brumbaugh, Graves, Donohue & Raymond

[57] ABSTRACT

In the embodiments described in the specification pollutants in the exhaust gas of a multi-cylinder internal combustion engine of a motor vehicle having an exhaust-gas purification device containing a catalyst in the exhaust line are reduced by controlling The air/fuel ratio supplied to the cylinders of the internal combustion engine in such a way that at least one of the engine cylinders is operated with a lean air/fuel ratio and the remaining cylinders are operated with a rich air/fuel ratio while a lambda value of approximately one is maintained in the overall exhaust flow from all the cylinders. In addition to rapid heating of the catalyst in the exhaust-gas purification device and compensation for a relatively low storage capacity of the catalyst, this arrangement also reduces the quantity of untreated exhaust upstream of the catalyst.

7 Claims, 3 Drawing Sheets

METHOD FOR REDUCING POLLUTANTS IN THE EXHAUST GAS OF A MULTI-CYLINDER INTERNAL COMBUSTION ENGINE

SPECIFICATION

BACKGROUND OF THE INVENTION

This invention relates to methods for reducing pollutants in the exhaust gas of multi-cylinder motor vehicle internal combustion engines.

In conventional multi-cylinder motor vehicles, an exhaust-gas purification device containing a catalyst is arranged in an exhaust line of the internal combustion engine and the air/fuel ratio of the internal combustion engine is set in such a way that a lambda value of approximately one is established in the overall exhaust flow from all the cylinders. In order to reduce the quantity of pollutants in the exhaust gas of an internal combustion engine operated with an air/fuel mixture, the exhaust gas is purified catalytically in the exhaust-gas purification device. In this process, the unburned hydrocarbons contained in the exhaust gas are oxidized to produce carbon dioxide and water, and the carbon monoxide which is also present in the exhaust gas is oxidized to produce carbon dioxide. Such oxidation processes make the presence of oxygen in the exhaust gas necessary. The nitrogen oxides produced during combustion of the air/fuel mixture in the internal combustion engine as a reaction product of oxygen and nitrogen from the air react in the catalyst of the exhaust-gas purification device with the carbon monoxide present in the exhaust gas to produce nitrogen and carbon dioxide.

Based on the fact that supplying additional air leads to a considerable reduction in the level of hydrocarbons and of carbon monoxide in the exhaust gas, it is known to supply the exhaust system with secondary air. U.S. Pat. No. 4,345,432 describes an internal combustion engine in which the emission of pollutants during the warm-up phase following a cold start is minimized by injecting secondary air into the exhaust line upstream of a catalyst device. For this purpose, a secondary air pump driven by the crankshaft of the internal combustion engine is provided, supplying air into the exhaust line in a controlled manner. However, such a secondary air pump leads to an increase in weight and reduces the useful power of the internal combustion engine.

To avoid this disadvantage, German Patent No. 40 29 672 discloses an arrangement in which the fuel supply to one cylinder of the internal combustion engine is interrupted in those operating ranges of the internal combustion engine during which the catalyst has an insufficient cleaning action, especially in the warm-up phase following a cold start, until the catalyst has reached its start-up temperature. This cylinder thus then delivers only fresh air, which passes directly to the inlet of the catalyst through the exhaust line. The fresh air causes a preliminary oxidation reaction in the untreated exhaust emissions and this preliminary reaction reduces the proportion of pollutants in the exhaust gas until the catalyst reaches its operating temperature. Deactivating an individual cylinder in this way causes temporary cooling of the cylinder wall, and this may give rise to stresses in the cylinder wall. In addition, the cooling of the cylinder wall can lead to the deposition of fuel components, especially of hydrocarbons. A further problem is that deactivating one cylinder in the case of internal combustion engines with four or fewer cylinders causes interruptions in the torque output, which are perceived as unpleasant by the occupants of the vehicle.

SUMMARY OF THE INVENTION

Accordingly, it is an object of the present invention to provide a method for reducing pollutants in the exhaust of multi-cylinder internal combustion engines which overcomes the disadvantages of the prior art.

Another object of the invention is to provide a method for reducing pollutants which causes neither comfort problems due to interruptions in the torque output nor temporary cooling of the cylinder wall, but nevertheless produces a significant reduction in the quantity of pollutants before and after exhaust-gas purification.

These and other objects of the invention are attained by operating at least one cylinder of the engine with a lean air/fuel ratio and the other cylinders with a rich air/fuel ratio while maintaining the lambda value of the overall exhaust flow from the engine approximately at one.

Thus, according to the invention, it is envisaged that, in the case of a conventional multi-cylinder internal combustion engine, at least one cylinder should be operated at least periodically with a lean air/fuel ratio and the remaining cylinders with a rich air/fuel ratio, a lambda value in the region of one being maintained in the exhaust gas from all the cylinders of the engine. As a result, the exhaust line of the internal combustion engine is provided periodically with an excess of oxygen to oxidize both the carbon monoxide and the hydrocarbons and with an excess of carbon monoxide to reduce the nitrogen oxides. This can advantageously be carried out temporarily in ranges where the cleaning action of the catalyst in the exhaust-gas purification device is inadequate, i.e., before the catalyst has reached its start-up temperature or when the start-up temperature is not achieved for a certain time. The excess oxygen increases the temperature of the catalyst and is provided preferably during the warm-up phase of the internal combustion engine following a cold start or at low engine speeds, for example during idling. At other times, the system is switched to a conventional closed-loop lambda control. When one or more cylinders are operated with a lean or rich air/fuel ratio in alternation for a period of time, the switchover to or from a normal closed-loop lambda control takes place as a function of the temperature of the exhaust-gas purification device or the temperature of the cooling water of the internal combustion engine and/or the speed or load of the internal combustion engine.

Another advantageous configuration of the invention includes operating the internal combustion engine continuously in a manner such that at least one cylinder is operated alternatively with a lean air/fuel ratio and a rich air/fuel ratio and the remaining cylinders are operated with a rich air/fuel ratio. In addition to the advantages in the warm-up phase or at low engine speeds, the alternation in time between a lean and a rich air/fuel ratio makes it possible to utilize exhaust-gas purification devices with a catalyst having a relatively low storage capacity or to compensate for the aging of the catalyst and hence for the lower storage capacity and the higher start-up temperature. By virtue of this storage capacity, a catalyst is able to store excess oxygen during phases of oxygen excess in the exhaust line, releasing this oxygen again in phases of a rich air/fuel mixture so as to convert the pollutants which are to be oxidized. The frequency of the change between a lean and a rich air/fuel ratio can be controlled as a function of the output signal of an oxygen sensor downstream of the catalyst. In the case of catalysts with a low storage capacity, the change between a lean and a rich air/fuel ratio preferably may take place at the cylinder ignition frequency. The magnitude of the lean or rich air/fuel ratio is advantageously controlled as a function of operating conditions of the internal combustion engine, for example the engine speed or load i.e., the throttle-valve position. This is advantageous particularly during the acceleration phases of the vehicle to improve performance and comfort and at high loads to avoid losses of power.

In addition to more rapid heating up of the catalyst of the exhaust-gas purification device, the method according to the invention also reduces the untreated emissions upstream of the catalyst.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
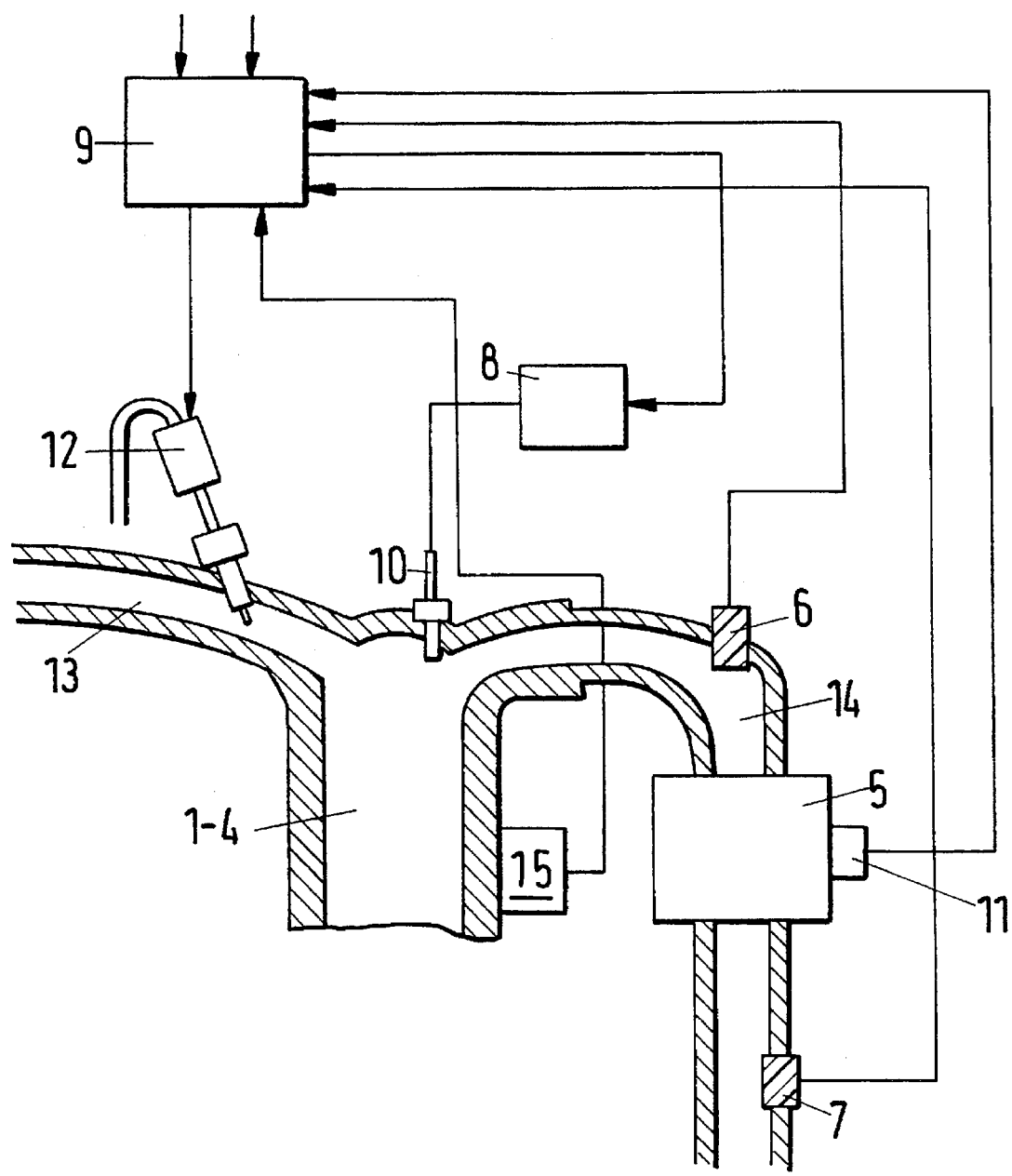
FIG. 1 is a schematic view illustrating an internal combustion engine and a representative embodiment of the control system for controlling the operation of the internal combustion engine, arranged to carry out the invention.

In the representative engine arrangement illustrated in FIG. 1, one of four cylinders 1 of a four cylinder internal combustion engine is provided with fuel injection into an intake pipe byway of an injection valve 12, each of the other cylinders 2–4 of the engine, not visible in FIG. 1, having a similar intake pipe and injection valve. It will be understood, however, that the method of the invention can also be carried out with an internal combustion engine having direct fuel injection into each cylinder. Each cylinder is supplied with fresh air to establish the proper air/fuel ratio by a corresponding inlet line 13. The internal combustion engine furthermore has a single exhaust line 14, connected to receive exhaust gases from all of the four cylinders, and the exhaust line contains a catalyst 5 and oxygen sensors 6 and 7 in the form of lambda probes located upstream and downstream, respectively, of a purification device containing the catalyst 5.

A control unit 9 supplies signals to an ignition device 8 to supply an ignition signal to a spark plug 10 to initiate ignition when the required air/fuel ratio, which is also controlled by the control unit 9, has been supplied to the cylinder. Using a conventional closed-loop lambda control system, the air/fuel ratio is set to maintain a lambda value of approximately one in the exhaust line 14. The lambda value is controlled on the one hand as a function of the operating conditions of the internal combustion engine, e.g., the engine speed and load, and on the other hand, as a function of the output signals of the oxygen sensor 6. To minimize the pollutant concentration upstream and downstream of the catalyst 5, the air/fuel mixture supplied to the cylinders 1–4 is formed alternately with a lean and a rich air/fuel ratio.

According to the invention, the air/fuel ratio supplied to each of the cylinders 1–4 is set according to various sensed parameters, taking into account the operating conditions of the internal combustion engine. These parameters include, for example, the engine speed or load of the internal combustion engine. Use of this parameter ensures that there are no problems with performance during acceleration or loss of power under high load conditions.

Another possibility is to control the air/fuel ratio for the cylinders as a function of the cooling water temperature of the internal combustion engine, as determined by a temperature detector 15, or as a function of the temperature of the catalyst, as determined by a temperature detector 11. When the detected temperature is below a selected threshold value, or when the threshold value is not maintained for a certain period of time, the setting of the air/fuel ratio in accordance with the invention as described above is carried out in conjunction with a conventional closed-loop control to maintain lambda approximately at one and, above the temperature threshold value, the setting of the air fuel ratio is carried out exclusively by the conventional closed-loop control to maintain lambda approximately at one. With this procedure it is possible to minimize the pollutant concentration in the exhaust gases, particularly during the warm-up phase following a cold start or when the internal combustion engine is idling.

According to another embodiment, in which the catalyst 5 has a low storage capacity and a relatively high start-up temperature, the air/fuel ratio supplied to the individual cylinders 1–4 is controlled without any time limit to produce lean and rich mixtures alternately, and the air/fuel ratio is set for example, as a function of the oxygen concentration downstream of the catalyst 5, as detected by the oxygen sensor, or as a function of the difference between the oxygen concentrations upstream and downstream of the catalyst.

Figure 2A:
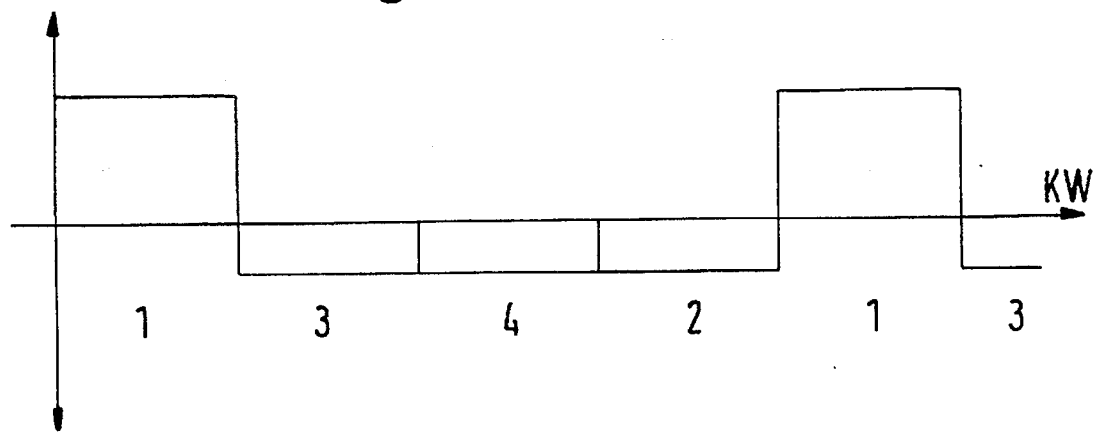
FIGS. 2a–2c are graphical representations illustrating different representative arrangements for varying the air/fuel ratio supplied to the cylinders of a four-cylinder internal combustion engine as a function of the crank angle.
Figure 2B:
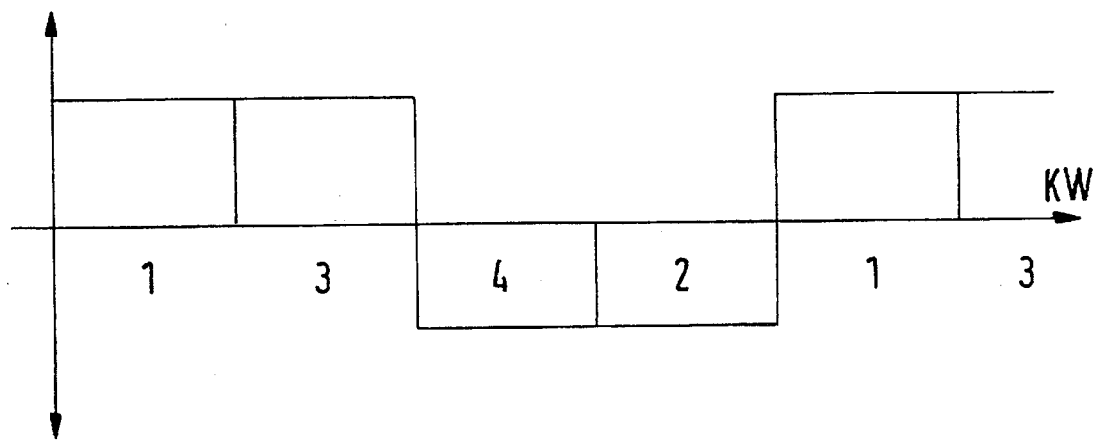
Figure 2C:
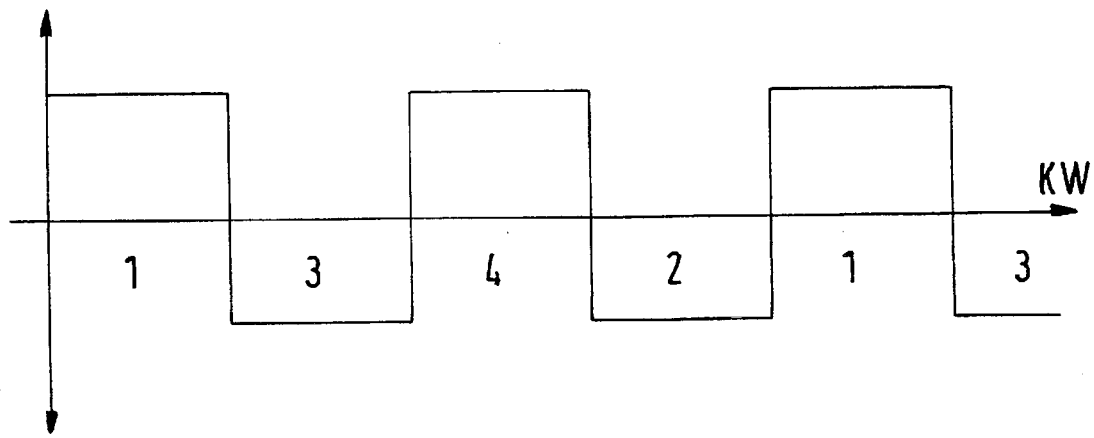

FIGS. 2a–2c show alternative ways to control the air/fuel ratios supplied to the individual cylinders 1–4 of a four-cylinder internal combustion engine with respect to the crank angle KW. Of course, a similar approach can also be adopted for internal combustion engines having a larger number of cylinders. In FIG. 2a, the cylinder 1 is operated at all times with a lean air/fuel ratio and all the other cylinders 2, 3 and 4 are operated with a rich air/fuel ratio. It should be noted here that the level of the air/fuel ratios supplied to all of the cylinders is always set so that total oxygen concentration prevailing in the exhaust line is in the vicinity of lambda=1. FIG. 2b shows another possible way of distributing the air/fuel ratios among the individual cylinders 1–4. This procedure can be necessary, for example, when one single cylinder cannot be operated with a lean or rich air/fuel ratio above a certain threshold value. To compensate for a relatively low storage capacity of the catalyst 5, it may furthermore be necessary, as FIG. 2c shows, to increase the frequency of the change to the engine ignition frequency, so that the cylinders 1–4 are operated alternately with lean and rich mixtures.

Figure 3A:
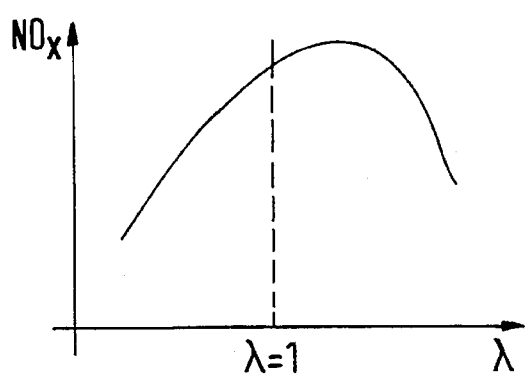
FIGS. 3a and 3b are graphical representations showing the nitrogen-oxide emission as a function of the lambda values and as a function of the spread between the lean and rich air/fuel ratio respectively.
Figure 3B:
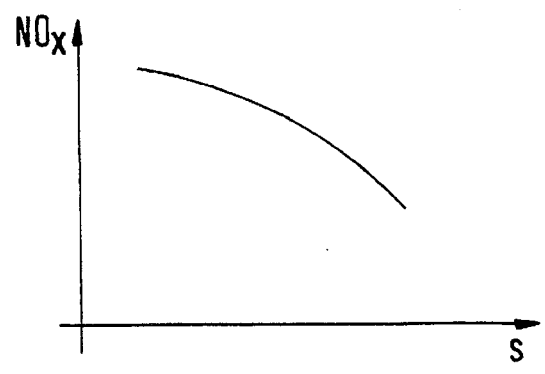
Figure 4A:
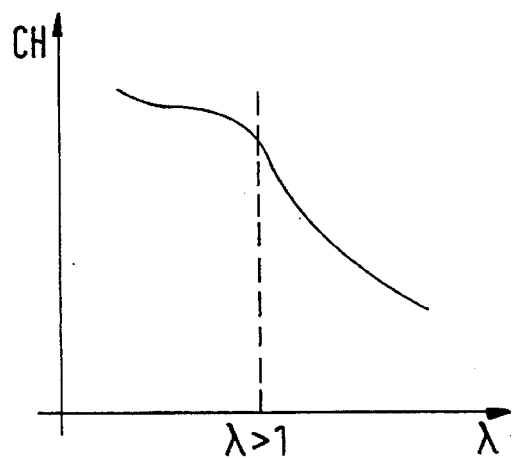
FIGS. 4a and 4b are graphical representations showing hydrocarbon emission as a function of the lambda values and as a function of the spread between the lean and rich air/fuel ratio, respectively.
Figure 4B:
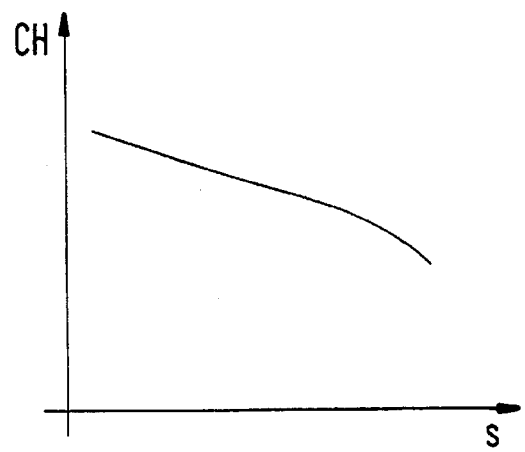

In addition, for more rapid heating up of the catalyst in the warm-up phase following a cold start and for compensation of a relatively low storage capacity of the catalyst, the invention provides the advantage that the quantity of untreated exhaust from the internal combustion engine in the exhaust line 14 is reduced. For the purpose of clarification, FIGS. 3a and 3b show respectively the characteristic of the nitrogen-oxide emission $NO_x$ with respect to the lambda value and with respect to the spread S between the lean and the rich air/fuel ratio of the individual cylinders and FIGS. 4a and 4b show respectively the characteristic of the hydrocarbon emission CH with respect to the lambda value and with respect to the spread S between the lean and the rich air/fuel ratio of the individual cylinders. From these characteristics, it can be seen that the nitrogen-oxide emission $NO_x$ has its highest values in the vicinity of lambda=1, while the hydrocarbon emission CH rises only slightly in the range of lambda<1 i.e., rich air/fuel ratio, but falls relatively sharply in the range of lambda >1 i.e., lean air/fuel ratio, making it possible to achieve a reduction in the quantity of untreated exhaust by a mixture distribution between the cylinders involving a lean and rich air/fuel ratio.

Although the invention has been described herein with reference to specific embodiments, many modifications and variations therein will readily occur to those skilled in the art. Accordingly, all such variations and modifications are included within the intended scope of the invention.

We claim:

1. A method for reducing pollutants in the exhaust gas of a multi-cylinder internal combustion engine of a motor vehicle having an exhaust gas purification device located in an exhaust line of the internal combustion engine comprising supplying at least one cylinder with a relatively lean air/fuel ratio and supplying the remaining cylinders with a relatively rich air/fuel ratio while maintaining the combined air/fuel ratio for all of the cylinders of the internal combustion engine at a level which produces a lambda value of approximately one in the overall exhaust flow from all the cylinders of the engine.

2. A method according to claim 1, including the step of supplying at least one of the cylinders alternately with a rich and a lean air/fuel ratio.

3. A method according to claim 1 including the step of controlling the distribution of the rich and the lean air/fuel ratios among the cylinders as a function of operating conditions of the internal combustion engine.

4. A method according to claim 1, including the step of controlling the magnitude of the air/fuel ratios of the individual cylinders as a function of operating conditions of the internal combustion engine.

5. A method according to claim 1, including the step of changing the air/fuel ratio supplied to the cylinders between a lean air/fuel ratio and a rich air/fuel ratio at the ignition frequency.

6. A method according to claim 1 including the steps of operating at least one cylinder with a lean air/fuel ratio and the remaining cylinders with a rich air/fuel ratio when the temperature of either the internal combustion engine or of the exhaust-gas purification device is below a threshold value and operating the internal combustion engine with conventional closed-loop lambda control to maintain lambda approximately equal to one when the temperature of either the internal combustion engine or of the exhaust-gas purification device is above a threshold value.

7. A method according to claim 6 wherein at least one cylinder is operated with a lean air/fuel ratio and the remaining cylinders are operated with a rich air/fuel ratio when the temperature is below the threshold value for a predetermined time.

* * * * *

UNITED STATES PATENT AND TRADEMARK OFFICE
CERTIFICATE OF CORRECTION

PATENT NO. : 5,661,971

DATED : September 2, 1997

INVENTOR(S) : Waschatz et al.

It is certified that error appears in the above-identified patent and that said Letters Patent is hereby corrected as shown below:

First Page, 2nd line of Item 75, "Brunswick" should read --Braunschweig--;

First Page, 2nd Column, delete line 4;

First Page, 5th line of ABSTRACT, "The" should read --the--;

Column 3, line 40, "byway" should read --by way--.

Signed and Sealed this

Fifth Day of May, 1998

*Attest:*

BRUCE LEHMAN

*Attesting Officer*     Commissioner of Patents and Trademarks